(12) United States Patent
Ludwig

(10) Patent No.: US 7,321,800 B2
(45) Date of Patent: Jan. 22, 2008

(54) CONTROL SYSTEM AND METHOD OF CONTROLLING AN INJECTION MOLDING MACHINE

(75) Inventor: Franz Josef Ludwig, Duerrholz (DE)

(73) Assignee: DR. BOY GmbH & Co. KG, Neustadt-Fernthal (DE)

( * ) Notice: Subject to any disclaimer, the term of this patent is extended or adjusted under 35 U.S.C. 154(b) by 0 days.

(21) Appl. No.: 11/293,339

(22) Filed: Dec. 2, 2005

(65) Prior Publication Data

US 2007/0112457 A1  May 17, 2007

(30) Foreign Application Priority Data

Nov. 17, 2005  (DE)  ............. 10 2005 054 769

(51) Int. Cl.
*G05B 11/00* (2006.01)
*G06F 19/00* (2006.01)
*G05B 19/18* (2006.01)

(52) U.S. Cl. ............. 700/20; 700/7; 700/9; 700/160

(58) Field of Classification Search ............. 700/7, 700/160, 200, 29, 20
See application file for complete search history.

(56) References Cited

U.S. PATENT DOCUMENTS

2004/0133285 A1* 7/2004 Fischbach et al. ............. 700/7

* cited by examiner

*Primary Examiner*—Michael D. Masinick
(74) *Attorney, Agent, or Firm*—Fay Sharpe LLP

(57) ABSTRACT

A control system for injection molding machines comprises a central control unit (26) for executing cyclical machine program sequences. Further, a visualization means (24, 25) is connected with the central control unit (26). The central control unit (26) has connected therewith, via an input/output means (16), an injection molding machine (18). According to the invention, an additional control unit (28) for cycle-independent processing of time-critical control steps is arranged independently of the central control unit (26) and is adapted for reducing the error-proneness. The additional control unit (28) is in particular an FPGA control unit.

14 Claims, 4 Drawing Sheets

CONTROL SYSTEM AND METHOD OF CONTROLLING AN INJECTION MOLDING MACHINE

BACKGROUND OF THE INVENTION

1. Field of the Invention

The invention relates to a method of controlling an injection molding machine.

2. Description of Related Art

Control systems for injection molding machines must execute a wide variety of different control/regulation functions. Said functions include, for example, control and/or regulation of a hydraulic means adapted in particular for moving an injection molding tool and/or injection molding die. Further, the screw conveyor, for example, must be operated and moved. Moreover, exact regulation and control of pressures and temperatures are necessary.

Conventional control systems for injection molding machines comprise a central control unit which typically is a Programmable Logic Controller (PLC). A visualization means comprising an industrial computer (IPC) and a display is used for visualization of the program sequences. The control unit is connected via an input/output means with the injection molding machine. Using the PLC, the machine program is cyclically executed. According to the relevance of the individual regulation and control functions, cycles of different duration of normally 100 ms, 10 ms and 2 ms are performed. During a cyclical execution of machine program sequences, each sampling of a switch, sensors and the like can be generally repeated only within a specific time period.

The execution of cyclical machine program sequences has considerable drawbacks, for example when a change-over from injecting the injection molding material to the holding pressure is carried out. The change-over from injection to the holding pressure is normally performed in a path- or pressure-dependent manner. In the two change-over variants, when a predetermined analog value has been reached, a hydraulic pump or a servo valve is changed over to a new target value which is normally lower than the previous target value. During cyclical machine program sequences, such as those executed by a PLC, irregularities frequently occur. If a corresponding signal is sampled, for example within a time period of one millisecond at a velocity of 200 mm/sec., a maximum error of 0.2 mm may occur. In the case of pressure-dependent change-over, pressure gradients of 10,000 bar/sec. occur, which may result in inaccuracies of 10 bar. The magnitude of an error depends on the point of time during the cycle at which the sampling is carried out, since only at the end of the cycle a corresponding action is taken, such as change-over to the holding pressure. The errors thus have different magnitudes. Consequently, as compared with constant errors, such an error cannot be compensated for.

Examinations revealed that cyclical machine program sequences have the drawback that the cycle time is subject to variation. Variations of up to 10% may occur. Consequently, the occurring error cannot be compensated for.

For reducing the occurrence of such errors it is common practice to trigger an interrupt signal as soon as a corresponding signal is given. The interrupt signal interrupts the cycle, and the control is capable of responding immediately and changing over from injection to the holding pressure. Triggering of such an interrupt signal is however an intervention into the cyclical machine program sequence which is thus error-prone.

In particular, the control modes triggered by the interrupt signal must be communicated to the cycle. Further, the generation of interrupt signals and the interruption of the cyclical execution of the machine program sequence have the drawback that the machine program steps following the interrupt signal are postponed in terms of time. This may result in disturbances. In particular in the case of successive control signals within a machine program sequence, which correspond with each other and/or are founded on each other and, for example, control an operation, the interruption may lead to a considerable disturbance.

The cycle of an injection molding machine includes a lot of movements and actions. In this connection it is not only important that the individual movements and actions are executed in a time-stable manner, but the combination of movements and actions must be extremely time-stable either. Since an injection molding process is a thermodynamic process, an exact cycle time is decisive for the dwell time of the thermoplastic material in the dosing and injecting means. Only when this dwell time can always be exactly complied with, the manufactured product comprises the required constant material qualities. Due to the cyclical execution using conventional IPCs or PLCs, inaccuracies in terms of time occur during each movement and/or action and each transition from one movement/action to the next. In the course of an overall cycle, these inaccuracies may cancel each other out, but they may also add up. This may result in noticeably differing cycle times which may lie within a range of 200 ms.

Further, older control systems are known to use a control unit essentially made up of hardware components instead of an electronic control unit. Here, for example, the position of a screw conveyor is detected via a cam controller, and the pressure and quantity control is effected via a hardware. Such systems are however extremely inflexible non-programmable systems, such that flexibly usable injection molding machines cannot be equipped with such control systems.

SUMMARY OF THE INVENTION

It is an object of the invention to provide a control system and a method of controlling injection molding machines, wherein the error-proneness is reduced.

The control system for injection molding machines according to the invention comprises, besides a central control unit for executing cyclical machine program sequences, an additional control unit. The additional control unit is independent of the central control unit and is adapted for cycle-independently processing time-critical control steps. The additional control unit is in particular a control unit comprising programmable gates, in particular a gate array. The programmable gate is freely programmable, wherein the gate is made up of corresponding logic modules. Preferably, an FPGA is provided as additional control unit and/or integrated in the additional control unit.

According to the invention, the additional control unit executes time-critical functions independently of cyclical machine program sequences. For example, the additional control unit, in particular the FPGA, carries out signal processing for changing over from injection to the holding pressure. Since in particular an additional control unit configured as an FPGA is in particular comparable to a control unit made up of hardware components, no or perhaps a small time delay occurs. This in particular eliminates the disadvantages of cyclical machine program sequences. Since, according to the invention, the individual program sequences are separated from each other, the embodiment of the control system according to the invention comprising a central control unit and an additional control unit further offers the advantage, as compared with generation of an interrupt signal, that during processing of the time-critical signal by the additional control unit, the execution of the cyclical machine program sequence in the central control unit is not affected. The additional control unit not only receives a corresponding signal but processes said signal, such that the additional control unit also responds to the occurring event by executing a corresponding program sequence. Due to the fact that the additional control unit, in particular the FPGA, performs important control functions, an exact and error-free control can be realized. In the example described above, an exact change-over from injection to the holding pressure is carried out. Thereby, the quality of the injection molded article, in particular the weight stability of the injection molded article, can be considerably improved.

Provision of an additional control unit, which is independent of the central control unit and/or carries out program sequences in parallel to the central control unit, further offers the advantage that not only the individual time-relevant movements and actions can be performed exactly in time, but that proceeding to the next stage of an overall cycle is not disturbed, as is the case when an interrupt signal is generated.

In injection molding machines, complex switching sequences of valves and the like must frequently be performed. In prior art machines, these switching sequences must be performed by the IPC or the PLC. In this connection, the switching sequence may change in the case of software modifications due to incorrect programming or unforeseen and/or unintentional influences exerted by one software section to another software section. Frequently such a soft-ware error is not immediately detected, such that a time-consuming and expensive inspection or reprogramming is necessary. According to the invention, such switching sequences are thus preferably stored in the additional control unit, in particular the FPGA. Reprogramming of the remaining software included in the central control unit can thus not exert any influence on the switching sequence or other program sequences stored in the additional control unit. Preferably, programming and/or configuration of the additional control unit, in particular the FPGA, are selected such that response times to analog signals of less than 100 μsec and processing times of 20 ns are realizable.

In a preferred embodiment of the invention, the additional control unit is further configured for signal processing. Moreover, basic program sequences can be executed by the additional control unit. These sequences are e.g. given switching sequences of valves, for example for high pressure buildup and/or high pressure reduction. The additional control unit executes these switching sequences autonomously and independently of the central control unit in a constant chronology and independent of the extent of the current workload of the control unit. Further, these switching sequences cannot be changed by software modifications carried out in the central control unit. This results in a minimization of software errors.

The essential advantage offered by a programmable logic module, such as an FPGA, provided in the additional control unit is that, contrary to conventional PLCs, no program is executed in the FPGA, but the desired control functions are available as a hardwired electronics after programming. Thus the input and output signals can be processed in parallel, and therefore there is no cycle time and no associated inaccuracy. It is particularly advantageous that the response time of the outputs to changes in the input signals remains constant. This is independent of the complexity of the application. The FPGA is preferably used for logic functions with regard to which the FPGA offers a particularly high efficiency. More complex arithmetical functions are preferably not performed by the FPGA but by the central control unit.

Performance of the control functions in two separate control units according to the invention allows the central control unit to be integrated in the IPC. In particular, the IPC, in conjunction with a display, performs the functions of a visualization means.

Since in modern control systems for injection molding machines a control unit for peripherals must frequently also be integrated, provision of a central control unit in combination with an independent additional control unit according to the invention offers the advantage that the system is prevented from becoming overloaded. Use of the control system according to the invention thus facilitates integration of the control unit for peripherals. Such a peripheral is, for example, an integrated control unit for removal of finished parts using corresponding handling systems.

Further, swapping of control functions out of the central control unit and into the additional control unit allows improvement of the visualization of machine program sequences with the aid of a visualization means. In particular, the operating surface can be improved.

In a particular preferred variant, an FPGA is used as an index means in the additional control unit. Here, indexing of the steps is in particular carried out in a non-preferential order as soon as the indexing conditions are fulfilled. In this connection, an indexing condition may be, for example, lapse of time, reaching of a specific location in a path, reaching of an end switch etc.

A particular advantage offered by use of an FPGA is that the execution of functions always takes the same time. This is in particular ensured when new functions are added. The reason for this is the parallel execution of all functions in the FPGA.

For example, the control system according to the invention allows an actual velocity value to be determined in a simpler and more accurate manner. In conventional cyclically operating control systems there is the problem that the velocity is determined by dividing the path travelled by a time interval. In particular at strongly varying velocities, this approach involves inaccuracies. If, for example, every ms a new velocity value is required, determination of the velocity at high velocities can be performed with a high degree of accuracy. At low velocities, measurement of the path travelled comprises however considerable inaccuracies. This is in particular due to the use of analog linear-displacement transducers whose resolution is limited by the system conditions. Use of an FPGA allows the number of measurements to be further increased and then mean values to be determined. The determination of mean values considerably improves the accuracy of the measurement even at low velocities. Performing the velocity measurement using the FPGA results in a substantial load reduction of the cyclical control system which, in addition, can always be furnished with a considerably exacter velocity value.

Further, the invention relates to a method of controlling an injection molding machine, in particular using a control system for injection molding machines as described above. In the method according to the invention, time-critical control steps are carried out, independently of the cyclical machine program sequences, in a separate control unit, in particular an additional control unit. In particular, in the control method according to the invention, the control signals of the two control units and the measured variables of individual sensors of the machine and the like are, at least partly, fed via the same inputs/outputs.

The control method according to the invention is further developed in an advantageous manner as described in particular on the basis of the control system.

BRIEF DESCRIPTION OF THE DRAWINGS

Hereunder the prior art and a preferred embodiment of the invention will be described in greater detail with reference to the drawings in which.

DETAILED DESCRIPTION OF THE PREFERRED EMBODIMENT OF THE INVENTION

Figure 1:
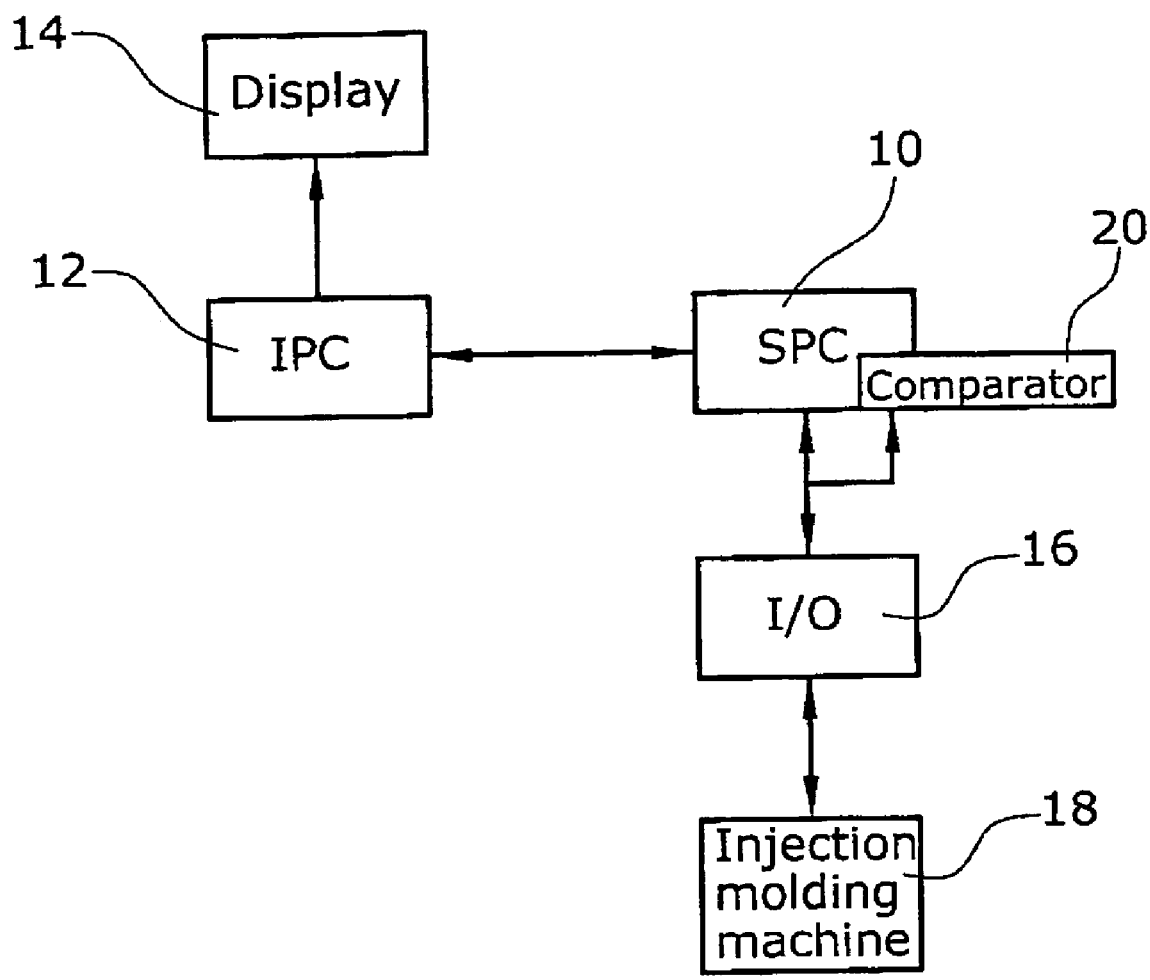
FIG. 1 shows a schematic diagram of a prior art control system.

A prior art control system (FIG. 1) comprises a central control unit 10 for performing cyclical machine program sequences, such as a PLC. The central control unit 10 communicates with a data processing means 12, such as an IPC. The IPC 12 is connected with a display 14 such that the IPC 12, together with the display 14, forms a visualization means.

The PLC 10 is connected with inputs/outputs 16 which, in turn, are connected with an injection molding machine 18.

The machine program sequences are performed by the PLC, wherein the machine program sequences are cyclically executed. For performing time-critical control steps, the PLC 10 is connected with a comparator 20 which processes interrupt signals. The generation of interrupt signals interrupts the cyclical sequence of the PLC and thus has the drawbacks described above.

Figure 2:
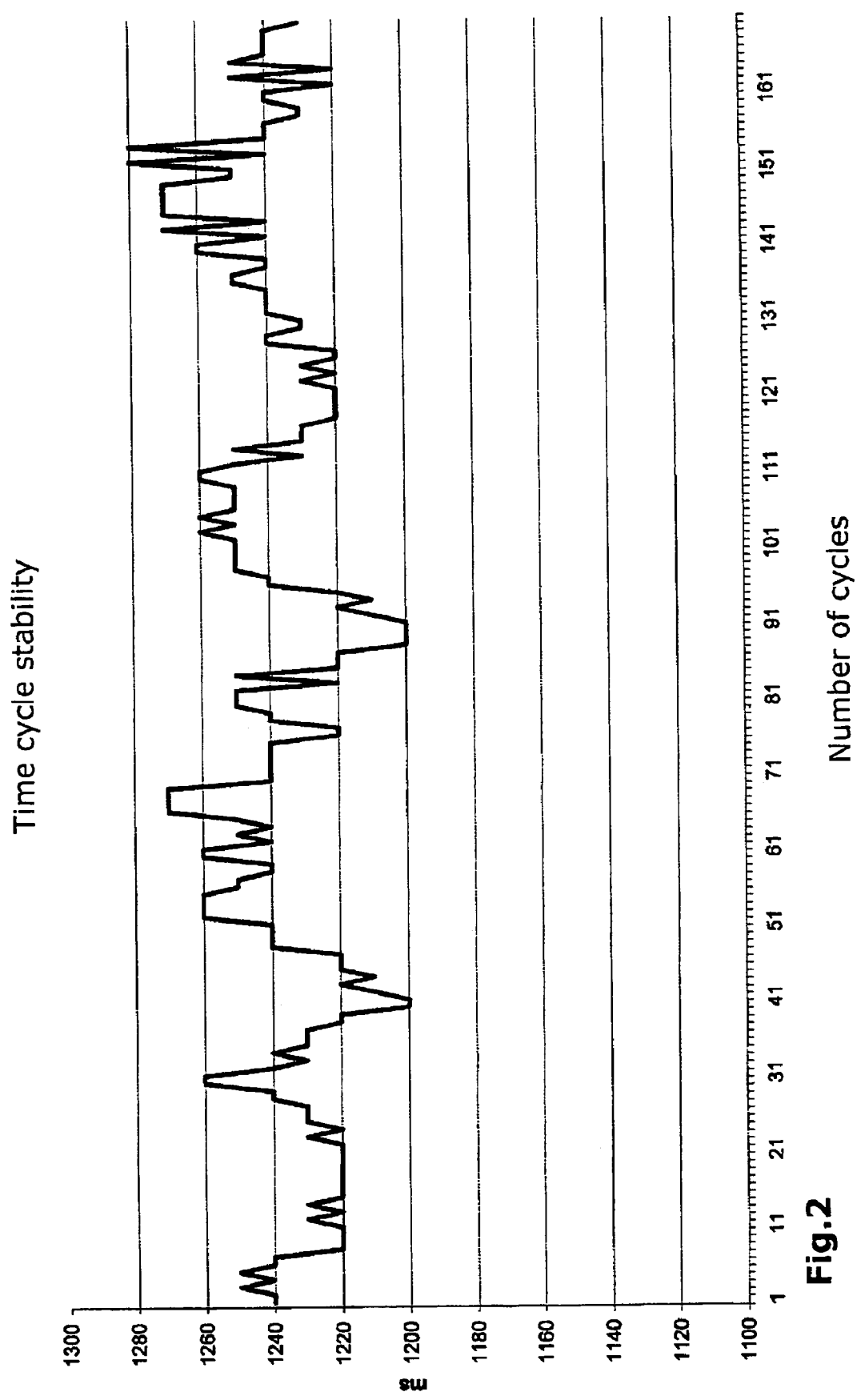
FIG. 2 shows a diagram of time and number of cycles in a prior art system.

With the aid of a prior art control system (FIG. 1), cycle times as shown in FIG. 2 can be realized. The diagram of FIG. 2 shows relatively strong variations in the cycle times during different injection shots, i.e. filling of the injection mold. Cycle time variations of up to 80 ms occur.

A preferred embodiment of the control system according to the invention comprises an IPC 22 in which on the one hand the control unit for a visualization means 24, i.e. the control unit for a display 25, and on the other hand the PLC 26 for executing cyclical machine program sequences are integrated.

According to the invention, an additional control unit 28 configured as an FPGA is arranged independently of the central control unit 26. The FPGA 28 and the PLC 26 are connected with the input/output connectors 16. The FPGA 28 may also be arranged between the PLC 26 and the connectors 16, wherein the signal from and/or to the PLC 26 pass through the FPGA 28.

Figure 3:
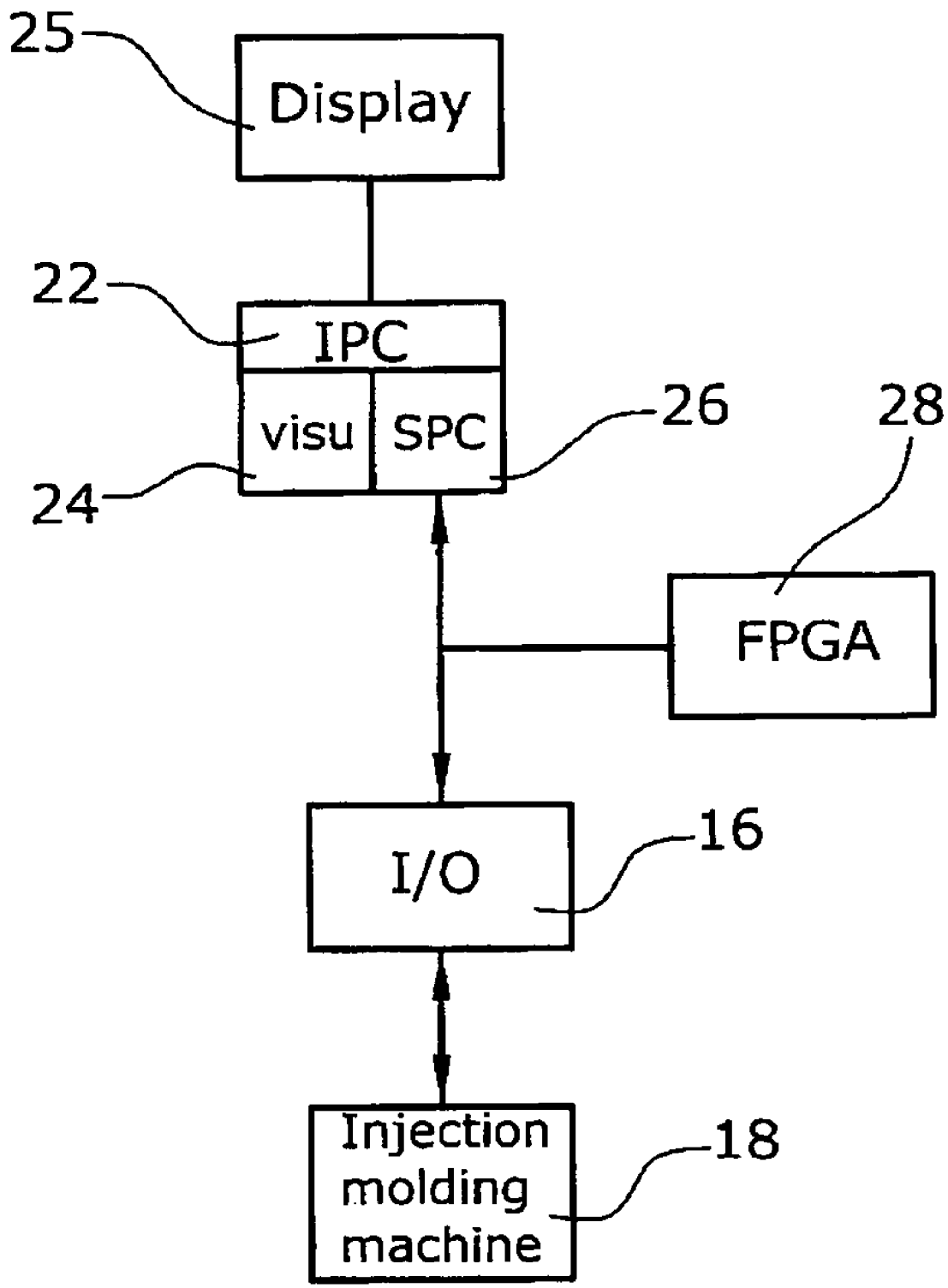
FIG. 3 shows a schematic diagram of a preferred embodiment of a control system according to the invention.
Figure 4:
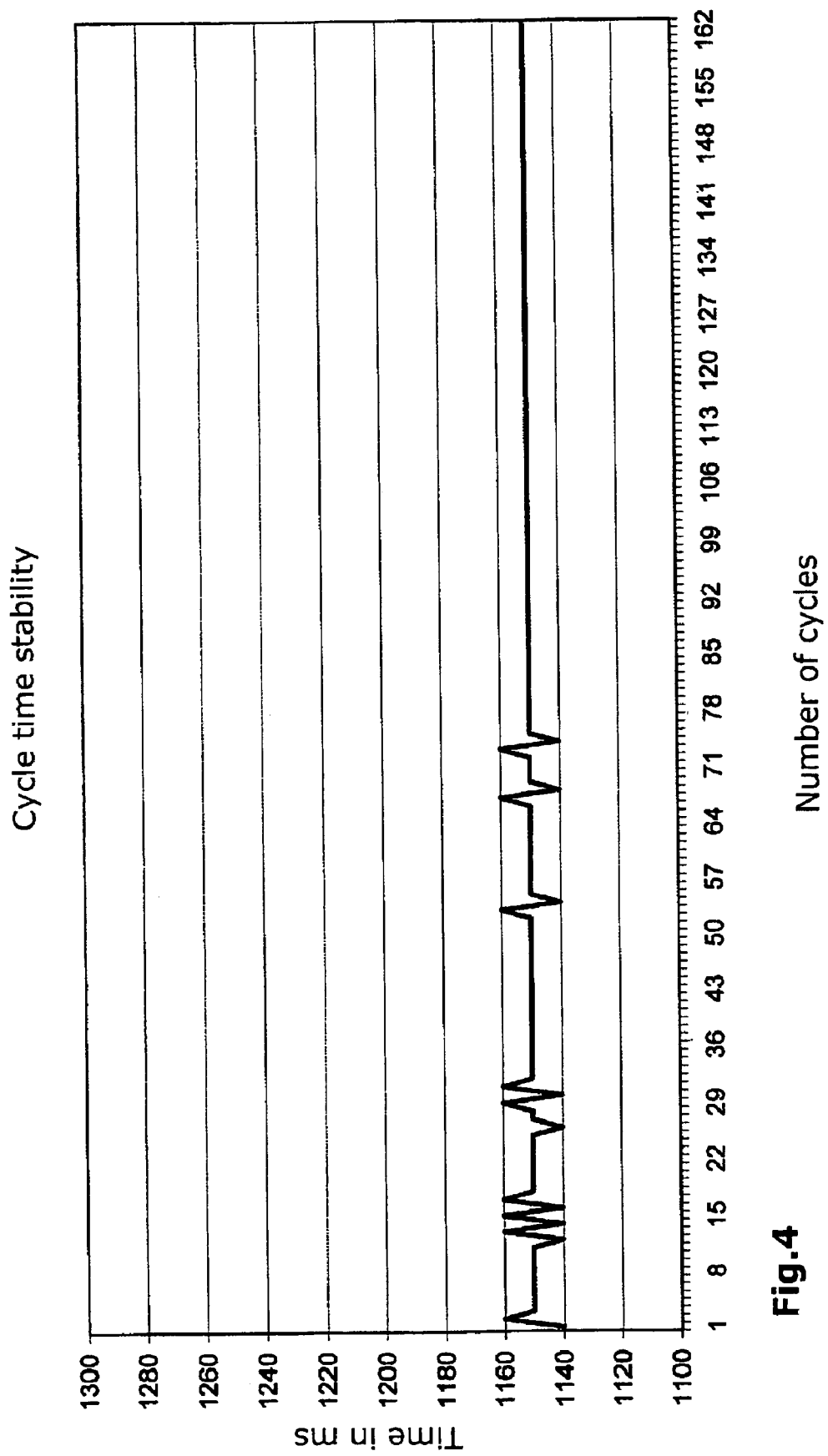
FIG. 4 shows a diagram of time and number of cycles in a control system according to the invention.

The control system according to the invention (FIG. 3) allows the cycle time variations shown in FIG. 4 to be realized. As can be seen from FIG. 4, the cycle time variations are considerably smaller. Here, the cycle time variations amount to max. 20 ms.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A control system for injection molding machines, comprising
    a central control unit for executing cyclical machine program sequences,
    a visualization means connected with the central control unit,
    an input/output means connected with the central control unit and the injection molding machine, and
    an additional control unit arranged independently of the central control unit, the additional control unit storing switching sequences in addition to the sequences stored in the central control unit and being adapted for cycle-independently processing time-critical control steps.

2. The control system according to claim 1, wherein the additional control unit comprises programmable gates, in particular a gate array.

3. The control system according to claim 1, wherein the additionally control unit comprises a field programmable gate array (FPGA) module.

4. The control system according to claim 1, wherein the additional control unit is configured and/or set up such that response times to analog signals of less than 100 μsec and processing times of less than 20 ns are realized.

5. The control system according to claim 1, wherein the additional control unit is additionally adapted for signal preprocessing.

6. The control system according to claim 1, wherein the additional control unit executes the basic program sequences of the machine program sequences.

7. The control system according to claim 1, wherein the additional control unit and the central control unit are, at least partly, connected with the same inputs/outputs of the input/output means.

8. The control system according to claim 1, wherein the central control unit and at least part of the visualization means comprise a shared data processing means.

9. A method of controlling an injection molding machine, in particular using a control system according to claim 1, wherein time-critical control steps are performed independently of cyclically machine program sequences in separate control units.

10. The control method according to claim 9, wherein the control signals of the two control units and measured variables of individual machine sensors are, at least partly, fed via the same inputs/outputs.

11. A control system for injection molding machines, comprising
    a central control unit which executes cyclical machine program switching sequences,
    a display connected with the central control unit,
    an input/output circuitry connected between the central control unit and the injection molding machine,
    an additional control unit independent of the central control unit which stores and executes switching sequences in addition to the switching sequences stored in the central control unit.

12. The control system according to claim 11, wherein the additional control unit is connected with the central control unit and the input/output circuitry.

13. The control system according to claim 11, wherein the additional control unit is connected to the input/output circuitry and is configured to receive signals from the input/output circuitry, process the received signals independently of the central control unit using the additional switching sequences to produce control signals which are conveyed to the input/output circuitry to control operations of the injection molding machine.

14. The control system according to claim 11, wherein the display is connected with the central control unit by an interprocessor communication (IPC) controller.

* * * * *